(12) United States Patent
Liu

(10) Patent No.: US 6,914,649 B2
(45) Date of Patent: Jul. 5, 2005

(54) ARRANGEMENT FOR PIXEL ARRAY OF COLOR FILTER

(75) Inventor: Chung-Yuan Liu, Tainan (TW)

(73) Assignee: Himax Technologies, Inc., Tainan (TW)

( * ) Notice: Subject to any disclaimer, the term of this patent is extended or adjusted under 35 U.S.C. 154(b) by 84 days.

(21) Appl. No.: 10/365,779

(22) Filed: Feb. 13, 2003

(65) Prior Publication Data

US 2003/0160915 A1 Aug. 28, 2003

(30) Foreign Application Priority Data

Feb. 25, 2002 (TW) .................................. 91103299 A

(51) Int. Cl.$^7$ .............................................. G02F 1/1335
(52) U.S. Cl. ................................. 349/109; 345/694
(58) Field of Search ........................ 349/106, 109, 349/145; 345/695, 696, 694

(56) References Cited

U.S. PATENT DOCUMENTS

| | | | | |
|---|---|---|---|---|
| 4,781,438 A | * | 11/1988 | Noguchi | 349/54 |
| 5,606,437 A | * | 2/1997 | Mosier | 349/106 |
| 5,715,025 A | * | 2/1998 | Ogurtsov et al. | 349/41 |
| 6,326,981 B1 | * | 12/2001 | Mori et al. | 345/695 |
| 6,614,498 B1 | * | 9/2003 | Tanaka et al. | 349/143 |
| 6,650,391 B2 | * | 11/2003 | Chang et al. | 349/144 |
| 6,714,206 B1 | * | 3/2004 | Martin et al. | 345/589 |
| 2003/0210361 A1 | * | 11/2003 | Kiguchi et al. | 349/106 |
| 2004/0017524 A1 | * | 1/2004 | Li | 349/106 |

* cited by examiner

Primary Examiner—Kenneth Parker
(74) Attorney, Agent, or Firm—Senniger Powers

(57) ABSTRACT

The present invention relates to a color filter with mosaic pixel array arrangement. The color filter comprises a plurality of pixel arrays. The pixel array has four sub-pixels. The color of the sub-pixel of the pixel array is identical to that of another sub-pixel of another pixel array adjacent to the pixel array. The sub-pixels with same color form a sub-pixel group so that the area of a single color of the sub-pixel group is increased. Therefore, the adhesion strength between the sub-pixel group and the substrate can be augmented to avoid peeling from the substrate. According to the invention, the yield rate of the product will be raised and the chromaticity will be improved.

9 Claims, 6 Drawing Sheets

ARRANGEMENT FOR PIXEL ARRAY OF COLOR FILTER

BACKGROUND OF THE INVENTION

1. Field of the Invention

The invention relates to a color filter, more particularly, to a color filter with mosaic pixel array arrangement and a color filter with delta pixel array arrangement.

2. Description of the Related Art

Referring to FIG. 1, a typical color filter 1 with mosaic pixel array arrangement is shown. Color filter 1 comprises a plurality of pixel arrays 11, 12 (shown in bold frames) that are arrayed to form a color filter 1. Each pixel array has four sub-pixels. Taking pixel array 11 for example, said pixel array 11 has a first green sub-pixel(G) 111, a red sub-pixel (R) 112, a blue sub-pixel(B) 113 and a second green sub-pixel(G) 114. The first green sub-pixel 111 and red sub-pixel 112 form the first row of pixel array 11. The blue sub-pixel 113 and second green sub-pixel 114 form the second row of pixel array 11. The arrangement of sub-pixel in other pixel arrays is identical to that in pixel array 11. Thus, mosaic pixel array arrangement of color filter 1 is formed.

Referring to FIG. 2, a typical color filter 2 with delta pixel array arrangement is shown. Color filter 2 comprises a plurality of pixel arrays 21, 22, 23 (shown in bold frames). Each pixel array has three sub-pixels. Taking first pixel array 21 for example, said first pixel array 21 has a red sub-pixel (R) 211, a green sub-pixel(G) 212 and a blue sub-pixel(B) 213. The green sub-pixel(G) 212 and blue sub-pixel(B) 213 are disposed in the second row. The red sub-pixel(R) 211 is disposed in the first row and between the green sub-pixel(G) 212 and blue sub-pixel(B) 213 to form the delta arrangement of first pixel array 21. The second pixel array 22 is disposed continuously in the third and fourth row of the color filter 2. The arrangement of three sub-pixels of the second pixel array 22 is identical to that of first pixel array 21 which is in delta pixel array arrangement. The third pixel array 23 is adjacent to the first pixel array 21, whereas the green sub-pixel(G) 231 and blue sub-pixel(B) 232 are disposed in the first row, and the red sub-pixel(R) 233 is disposed in the second row and between the green sub-pixel(G) 231 and blue sub-pixel(B) 232 to form the inverse delta arrangement of third pixel array 23. Therefore, the delta pixel array arrangement of color filter 2 is formed by a plurality of pixel arrays.

The size of one single color sub-pixel in the above-mentioned typical mosaic pixel array arrangement and delta pixel array arrangement is very small. In the application of high-resolution liquid-crystal display, the size of one single color sub-pixel must be reduced from the typical several tens of micrometers to several micrometers. Thus, the difficulty of manufacture of color filter is raised. In particular, the single color sub-pixel must be adhered on a substrate, so the small size of the single color sub-pixel results in the little adhesion strength between the single color sub-pixel and the substrate. Therefore, the peeling of the single color sub-pixel from the substrate will occur easily, and the rejection rate of the product will be raised.

Referring to FIG. 3, a typical color filter applied to reflective type liquid crystal display is shown. The liquid-crystal display module 3 comprises a glass substrate 31, a reflective electrode layer 32, a first alignment film 33a, a liquid crystal layer 34, a second alignment film 33b, a transparent electrode layer 35, a color filter 36 and a transparent substrate 37. As mentioned above, color filter 36 has a plurality of pixel arrays. Taking delta pixel array arrangement for example, a pixel array has a red sub-pixel 361, a green sub-pixel 362, and a blue sub-pixel 363.

The incident light (white light) W1 passes through the transparent substrate 37, red sub-pixel 361, transparent electrode layer 35, second alignment film 33b, liquid crystal layer 34, first alignment film 33a and reflective electrode layer 32, then reflects to said layers from reflective electrode layer 32. The reflection light F1 has the chromaticity of red color and green color since it passes through green sub-pixel 362. For the same reason, the reflection light F3 has the chromaticity of green color and blue color, and only reflection light F2 has pure green color. Once the size of the sub-pixel becomes smaller, the situation of chromaticity will be more serious.

Consequently, there is a need for a novel and improved pixel array arrangement to solve above-mentioned problem.

SUMMARY OF THE INVENTION

The primary object of this invention is to provide a color filter with mosaic pixel array arrangement. The color filter comprises a plurality of pixel arrays. The pixel array has four sub-pixels. The color of the sub-pixel of the pixel array is identical to that of another sub-pixel of another pixel array adjacent to the pixel array. The sub-pixels with the same color form a sub-pixel group so that the area of a single color of the sub-pixel group is increased.

Another object of this invention is to provide a color filter with delta pixel array arrangement. The color filter comprises a plurality of delta arranged pixel arrays. Each of the delta arranged pixel arrays has three sub-pixels to form a row. The color of sub-pixel of a pixel array is identical to that of another adjacent sub-pixel of another adjacent pixel array to form a sub-pixel group, so that the area of a single color of the sub-pixel group is increased.

Therefore, the area of a single color of the sub-pixel group is increased according to the mosaic pixel array and delta pixel arrangement. So, the adhesion strength between the sub-pixel group and the substrate can be augmented to avoid peeling from the substrate. According to the invention, the yield rate of the product will be raised and the chromaticity will be improved.

The structures and characteristics of this invention can be realized by referring to the appended drawings and explanations of the preferred embodiments.

The following Examples are given for the purpose of illustration only and are not intended to limit the scope of this invention.

DETAILED DESCRIPTION OF THE INVENTION

Figure 4:
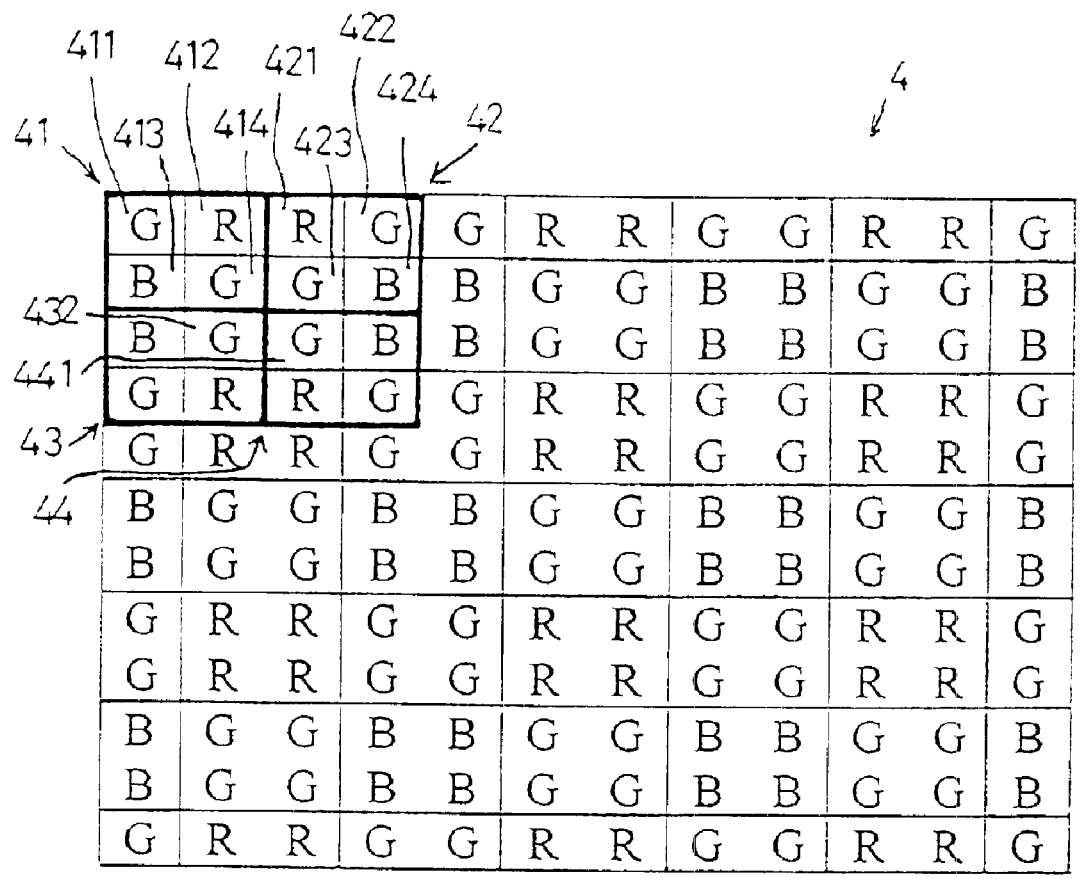
FIG. 4 is a schematic representation of a color filter with mosaic pixel array arrangement of the present invention.

Referring to FIG. 4, a color filter with mosaic pixel array arrangement according the present invention comprises a plurality of pixel arrays 41, 42, 43 and 44 (shown in bold frames). Each of said pixel arrays has four sub-pixels arranged in adjacent arrays. Taking first pixel array 41 for example, said first pixel array 41 has a first green sub-pixel 411, a red sub-pixel 412, a blue sub-pixel 413 and a second green sub-pixel 414. The first green sub-pixel 411 and red sub-pixel 412 form the first row of first pixel array 41. The blue sub-pixel 413 and second green sub-pixel 414 form the second row of first pixel array 41.

The second pixel array 42 is adjacent to the first pixel array 41, but the color disposition of the sub-pixel of the second pixel array 42 is different from that of first pixel array 41. Second pixel array 42 also has four sub-pixels, wherein the red sub-pixel 421 and the first green sub-pixel 422 form the first row of second pixel array 42, which is in the opposite color sequence from the first row of first pixel array 41. The second green sub-pixel 423 and the blue sub-pixel 424 of the pixel array 42 form the second row of second pixel array 42, which is also in the opposite color sequence from the second row of first pixel array 41.

Therefore, red sub-pixel 412 of first pixel array 41 and red sub-pixel 421 of second pixel array 42 are adjacent and have the same color. Also, second green sub-pixel 414 of first pixel array 41 and second green sub-pixel 423 of second pixel array 42 are adjacent and have the same color, second green sub-pixel 414 of first pixel array 41 and first green sub-pixel 432 of third pixel array 43 are adjacent and have the same color, and second green sub-pixel 423 of second pixel array 42 and first green sub-pixel 441 of fourth pixel array 44 are adjacent and have the same color.

Consequently, four adjacent sub-pixels 414, 423, 432 and 441 with same color in adjacent pixel arrays 41, 42, 43 and 44 form a green sub-pixel group. The green sub-pixel group is four times the area of one single green sub-pixel, since it is formed by four adjacent sub-pixels 414, 423, 432 and 441. In the manufacture process, the green sub-pixel group is formed on the substrate and the adhesion strength therebetween is increased to avoid peeling from the substrate because the green sub-pixel group is four times the area of typical sub-pixel.

It is to be noted that the colors of adjacent sub-pixels of adjacent pixel arrays are identical, and adjacent sub-pixels with the same color in adjacent pixel arrays form a sub-pixel group so that the area of the sub-pixel group is increased. In other words, each of said pixel arrays has four sub-pixels arranged in arrays, and the disposition of sub-pixels of each said pixel array is in mirror image relation to the disposition of sub-pixels of another adjacent pixel array. So, the disposition of pixel arrays does not enlarge the area of single sub-pixel, but changes the position of sub-pixels of pixel arrays, so that the color of said sub-pixel of said pixel array is identical to that of adjacent sub-pixel of another pixel array adjacent to the pixel array. As mentioned above, the sub-pixel group is formed by four sub-pixels of four pixel arrays, and the area of one sub-pixel is fixed, but the area of formed sub-pixel group is increased four times to reduce the difficulty of manufacture and raise the yield rate of the product.

Figure 5:
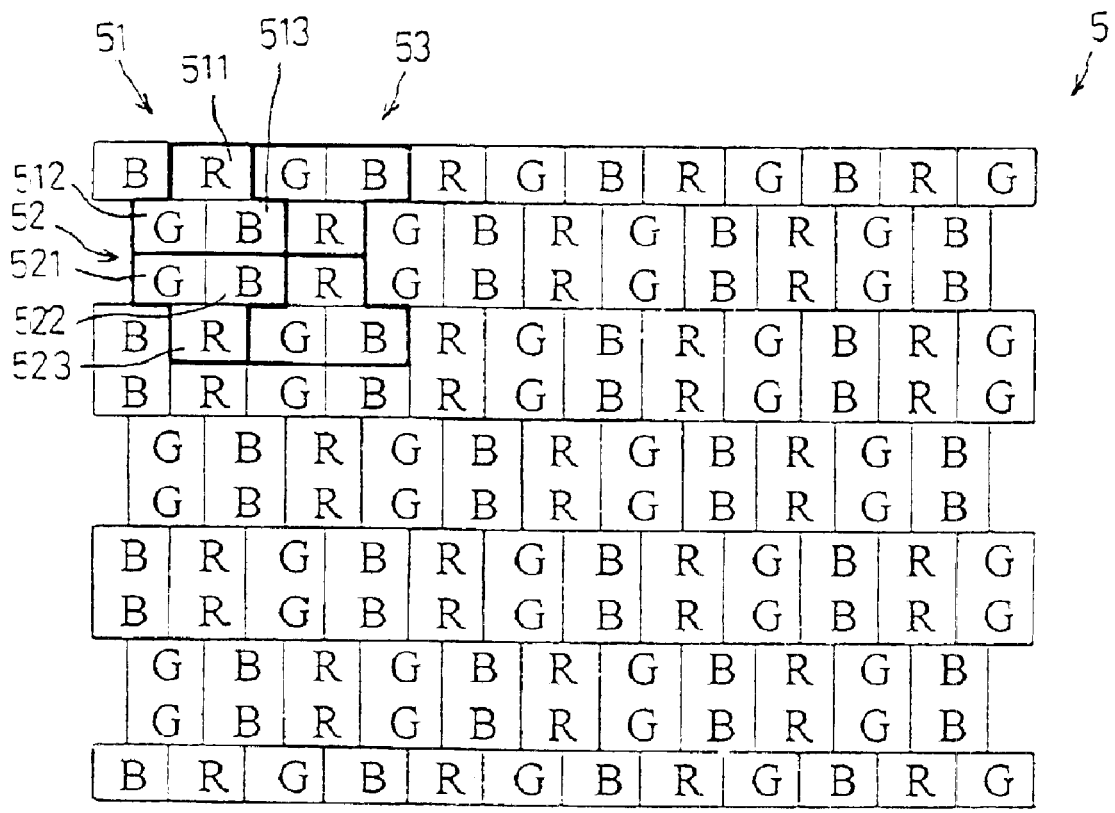
FIG. 5 is a schematic representation of a color filter with delta pixel array arrangement of the present invention.

Referring to FIG. 5, a color filter with delta pixel array arrangement according the present invention comprises a plurality of pixel arrays 51, 52, and 53 (shown in bold frames). Each of said pixel arrays has three sub-pixels. Taking first pixel array 51 for example, said first pixel array 51 has a red sub-pixel 511, green sub-pixel 512 and a blue sub-pixel 513. The green sub-pixel 512 and blue sub-pixel 513 are disposed in the second row, whereas the red sub-pixel 511 is disposed in the first row and correspondent to the center of green sub-pixel 512 and blue sub-pixel 513 to form the delta arrangement of first pixel array 51.

The second pixel array 52 is adjacent to and under the first pixel array 51. The second pixel array 52 also has a green sub-pixel 521, a blue sub-pixel 522 and a red sub-pixel 523. The green sub-pixel 521 and blue sub-pixel 522 are disposed in the first row, whereas the red sub-pixel 523 is disposed in the second row and correspondent to the center of green sub-pixel 521 and blue sub-pixel 522 to form the inverse delta arrangement of second pixel array 52.

The third pixel array 53 is also an inverse delta pixel array to arrangement, and is adjacent to the first pixel array 51 in the row direction. So, the delta arranged pixel arrays and inverse delta arranged pixel arrays are disposed alternately and recurrently to form a series in the row direction.

There is a shift of 1.5 times the width of sub-pixel between series, so that the second pixel array 52 with inverse delta arrangement is adjacent to the first pixel array 51 with delta arrangement. Therefore, green sub-pixel 512 of first pixel array 51 and green sub-pixel 521 of second pixel array 52 are adjacent and have the same color to form a green sub-pixel group. Also, the blue sub-pixel 513 of first pixel array 51 and the blue sub-pixel 522 of second pixel array 52 are adjacent and have the same color to form a blue sub-pixel group. The blue sub-pixel group is two times the area of one single blue sub-pixel. Therefore, the adhesion strength between the sub-pixel group and the substrate can be augmented to avoid peeling from the substrate, and the yield rate of the product will be raised.

Figure 6:
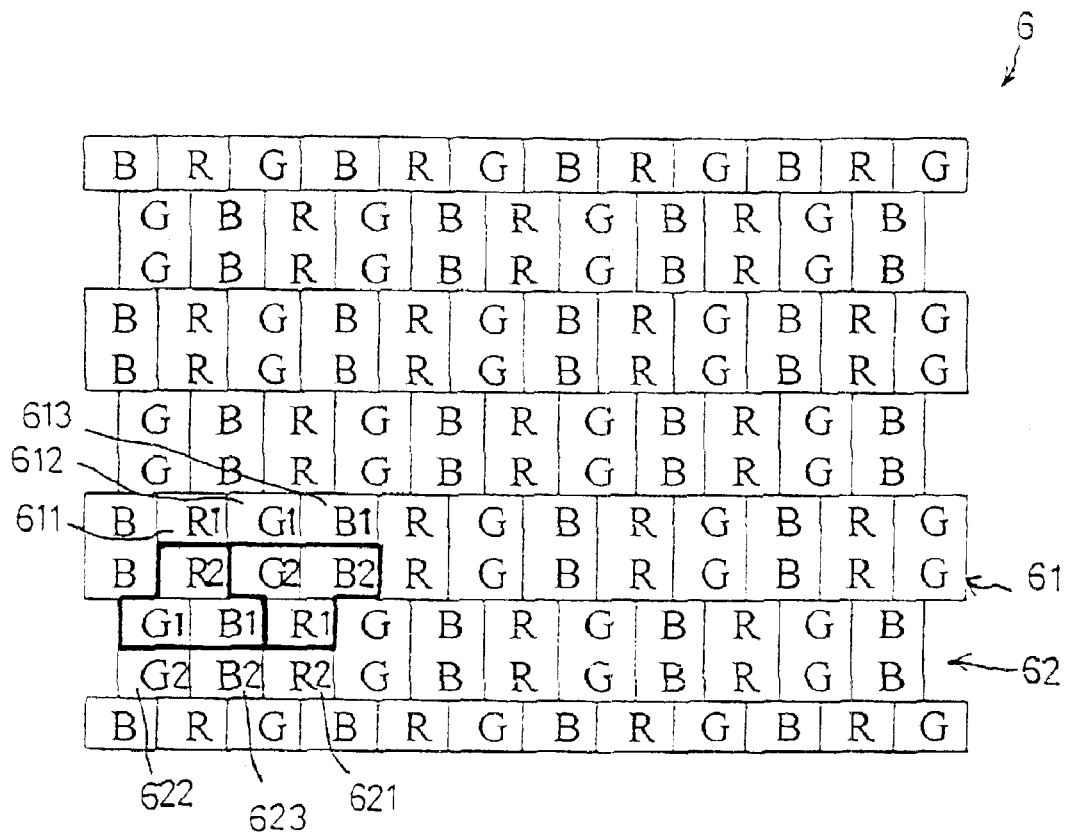
FIG. 6 is a schematic representation of a color filter with delta pixel array arrangement of the present invention.

Referring to FIG. 6, a color filter according the present invention comprises a plurality of first pixel rows 61 and a plurality of second pixel rows 62 periodically disposed linearly in the column direction. The first pixel row 61 has a plurality of color groups that are periodically disposed in the sequence of first color group 611, second color group 612 and third color group 613 in the row direction wherein each color group comprises a first sub-pixel (R1/G1/B1) and a second sub-pixel (R2/G2/B2) in the column direction. Taking the first color group 611 for example, said first color group 611 is red and comprises a first sub-pixel R1 and a second sub-pixel R2.

There is a shift of 1.5 time the width of sub-pixel between first pixel row 61 and second pixel row 62 in the row direction. The second sub-pixel R2 of first color group 611 of first pixel row 61, the first sub-pixel G1 of second color group 622 of second pixel row 62 and the first sub-pixel B1 of third color group 623 of second pixel row 62 form a delta arranged display pixel (shown in bold frames). Also, the second sub-pixel G2 of second color group 612 of first pixel row 61, the second sub-pixel B2 of third color group 613 of first pixel row 61 and the first sub-pixel R1 of first color group 621 of second pixel row 62 form another delta arranged display pixel (shown in bold frames).

Figure 1:
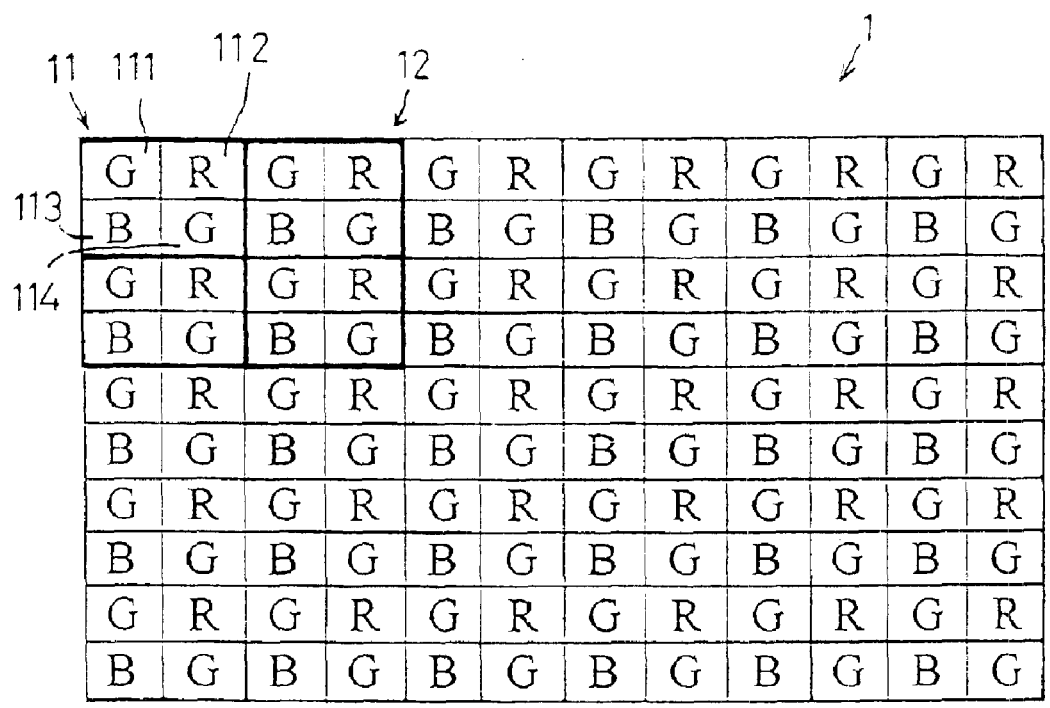
FIG. 1 is a schematic representation of a typical color filter with mosaic pixel array arrangement of the prior art.
Figure 2:
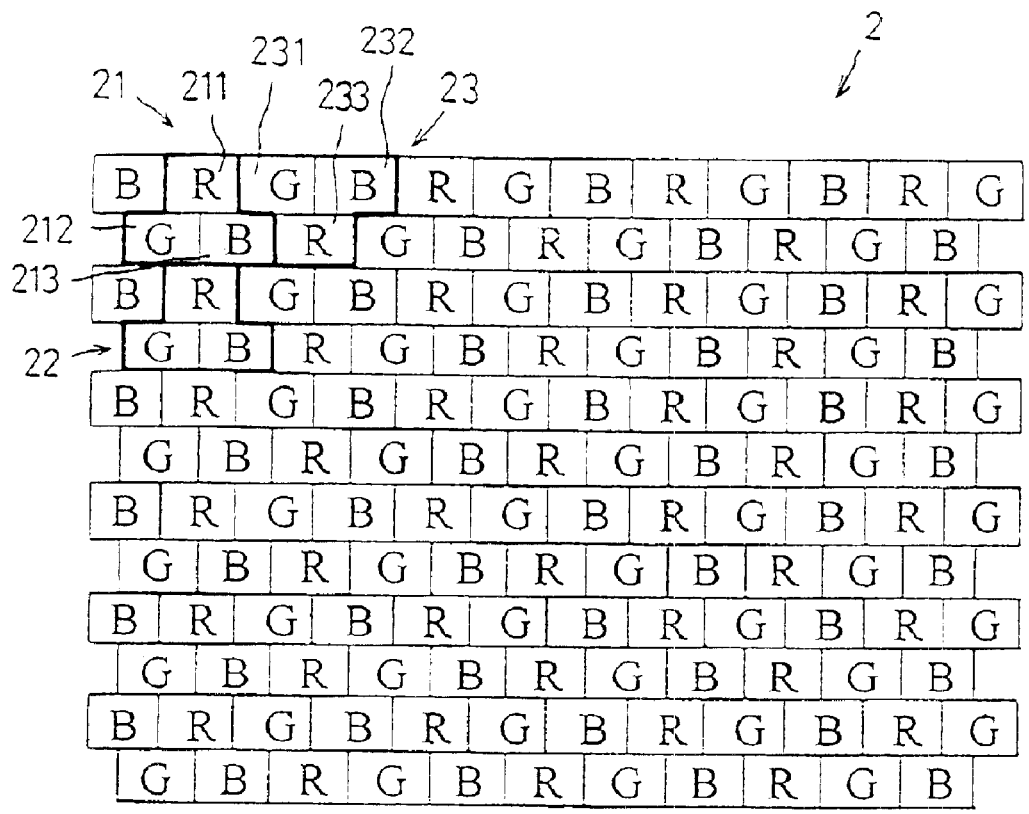
FIG. 2 is a schematic representation of a typical color filter with delta pixel array arrangement of the prior art.
Figure 3:
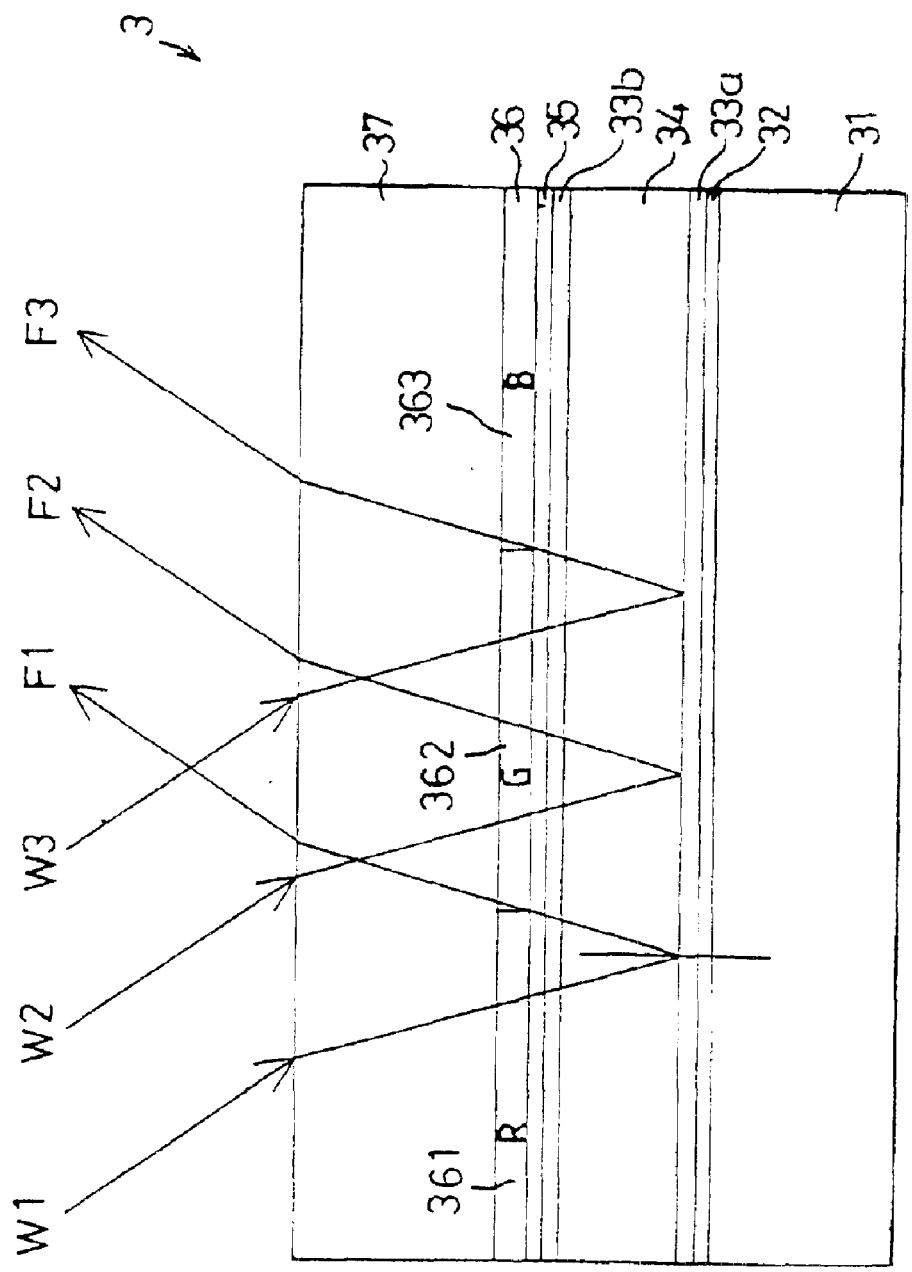
FIG. 3 is a schematic representation of a typical color filter applied to reflective type liquid crystal display of the prior art.

Now referring to FIG. 3, as described in "Description of the Related Art", the situation of chromaticity is very serious because the size of the single sub-pixel of high-resolution liquid-crystal display is appropriate small. However, the area of sub-pixel group will increase to two to four times according the pixel array arrangement of the present invention, so that the chromaticity will just occur in the interface of the sub-pixel groups and the color of the central area of the sub-pixel group will be pure, thus the typical chromaticity will be improved.

Therefore, a color filter 4 with mosaic pixel array arrangement or a color filter 5 with delta pixel array arrangement of the present invention can be disposed on the transparent electrode layer 35 (shown in FIG. 3) or reflective electrode layer 32 of a liquid crystal display, and can achieve the above-mentioned effectiveness.

While several embodiments of this invention have been illustrated and described, various modifications and improvements can be made by those skilled in the art. The embodiments of this invention are therefore described in an illustrative but not restrictive sense. It is intended that this invention may not be limited to the particular forms as illustrated, and that all modifications which maintain the spirit and scope of this invention are within the scope as defined in the appended claims.

What is claimed is:

1. A color filter with delta pixel array arrangement, said color filter comprising:

a plurality of delta arranged pixel arrays, each of said delta arranged pixel arrays having three sub-pixels, two of which are disposed in the second row of said delta arranged pixel array, and the other one sub-pixel is disposed in the first row of said delta arranged pixel array and correspondent to a first region between said two sub-pixels in the second row of said delta arranged pixel array; and a plurality of inverse delta arranged pixel arrays, each of said inverse delta arranged pixel arrays having three sub-pixels, two of which are disposed in a first row of said inverse delta arranged pixel array, and the other one sub-pixel is disposed in a second row of said inverse delta arranged pixel array and correspondent to a second region between said two sub-pixels in the first row of said inverse delta arranged pixel array;

wherein said delta arranged pixel arrays and said inverse delta arranged pixel arrays are disposed adjacently and alternately to form a plurality of series in parallel with each other, whereby each of said sub-pixels of said pixel array in one of said series has a same color as an adjacent sub-pixel of its adjacent pixel array in an adjacent series, such that said sub-pixels having the same color form a sub-pixel group.

2. The color filter claimed in claim 1, wherein each of said three sub-pixels has red, green and blue colors respectively.

3. A liquid crystal display apparatus, comprising:

a substrate;

a reflective electrode layer disposed above said substrate;

a liquid crystal layer disposed above said reflective electrode layer;

a transparent electrode layer disposed above said liquid crystal layer;

and a color filter disposed above said transparent electrode layer, said color filter comprising:

a plurality of delta arranged pixel arrays, each of said delta arranged pixel arrays having three sub-pixels, two of which are disposed in the second row of said delta arranged pixel array, and the other one sub-pixel is disposed in the first row of said delta arranged pixel array and correspondent to a first region between said two sub-pixels in the second row of said delta arranged pixel array; and a plurality of inverse delta arranged pixel arrays, each of said inverse delta arranged pixel arrays having three sub-pixels, two of which are disposed in a first row of said inverse delta arranged pixel array, and the other one sub-pixel is disposed in a second row of said inverse delta arranged pixel array and correspondent to a first region between said two sub-pixels in the second row of said delta arranged pixel array;

wherein said delta arranged pixel arrays and said inverse delta arranged pixel arrays are disposed adjacently and alternately to form a plurality of series in parallel with each other, whereby each of said sub-pixels of said pixel array in one of said series has a same color as an adjacent sub-pixel of its adjacent pixel array in an adjacent series, such that said sub-pixels having the same color form a sub-pixel group.

4. The liquid crystal display apparatus claimed in claim 3, wherein said four sub-pixels of said pixel array have red, green, blue and green colors respectively.

5. A liquid crystal display apparatus, comprising:

a substrate;

a reflective electrode layer disposed above said substrate;

a color filter disposed above said reflective electrode layer, said color filter comprising:

a plurality of delta arranged pixel arrays, each of said delta arranged pixel arrays having three sub-pixels, two of which are disposed in the second row of said delta arranged pixel array, and the other one sub-pixel is disposed in the first row of said delta arranged pixel array and correspondent to a first region between said two sub-pixels in the second row of said delta arranged pixel array; and a plurality of inverse delta arranged pixel arrays, each of said inverse delta arranged pixel arrays having three sub-pixels, two of which are disposed in a first row of said inverse delta arranged pixel array, and the other one sub-pixel is disposed in a second row of said inverse delta arranged pixel array and correspondent to a second region between said two sub-pixels in the first row of said inverse delta arranged pixel array;

wherein said delta arranged pixel arrays and said inverse delta arranged pixel arrays are disposed adjacently and alternately to form a plurality of series in parallel with each other, whereby each of said sub-pixels of said pixel array in one of said series has a same color as an adjacent sub-pixel of its adjacent pixel array in an adjacent series, such that said sub-pixels having the same color form a sub-pixel group; a liquid crystal layer disposed above said color filter; and a transparent electrode layer disposed above said liquid crystal layer.

6. The liquid crystal display apparatus claimed in claim 5, wherein said four sub-pixels of said pixel array have red, green, blue and green colors respectively.

7. A color filter, comprising:

at least one first pixel row each having a first color group, a second color group and a third color group, said three color groups being periodically disposed linearly, each of said color groups having a first sub-pixel and a second sub-pixel arrayed in column; and at least one second pixel row each adjacent to and identical to said first pixel row;

wherein said first pixel row and said second pixel row are shifted in row by 1.5 times the width of said sub-pixel; said second sub-pixel of said first color group of said first pixel row, said first sub-pixel of said second color group of said second pixel row, and said first sub-pixel of said third color group of said second pixel row form a display pixel;

said second sub-pixel of said second color group of said first pixel row, said second sub-pixel of said third color group of said first pixel row, and said first sub-pixel of said first color group of said second pixel row form another display pixel.

8. The color filter claimed in claim 7, wherein said first, second and third color groups have red, green and blue colors respectively.

9. The color filter claimed in claim 7, further comprising:

a plurality of first pixel rows; and a plurality of second pixel rows;

wherein said first pixel rows and said second pixel rows are periodically disposed linearly in column.

* * * * *